United States Patent [19]

Moghe

[11] Patent Number: 5,080,547
[45] Date of Patent: Jan. 14, 1992

[54] TRIAXIALLY BRAIDED COMPOSITE NUT AND BOLT

[75] Inventor: Sharad R. Moghe, Northfield Center, Ohio

[73] Assignee: The B. F. Goodrich Company, Akron, Ohio

[21] Appl. No.: 502,375

[22] Filed: Mar. 30, 1990

[51] Int. Cl.⁵ .............................................. F16B 37/16
[52] U.S. Cl. ................................... 411/436; 411/424; 411/901; 411/908; 156/393
[58] Field of Search .............. 411/411, 424, 427, 436, 411/366, 901–904, 908; 405/259–261; 403/343; 156/391–393

[56] References Cited

U.S. PATENT DOCUMENTS

| | | | |
|---|---|---|---|
| Re. 28,574 | 10/1975 | Ruoff | 425/78 |
| 2,306,516 | 12/1942 | Zahn | 22/190 |
| 2,915,110 | 12/1959 | Ferguson et al. | 156/393 |
| 3,283,050 | 11/1966 | Boggs | 411/900 |
| 3,394,527 | 7/1968 | McLean | 405/260 |
| 3,495,494 | 2/1970 | Scott | |
| 3,579,402 | 5/1971 | Goldsworthy et al. | 156/392 |
| 4,265,981 | 5/1981 | Campbell | 428/591 |
| 4,326,905 | 4/1982 | Tanaka | 156/393 |
| 4,389,269 | 1/1983 | Cooper | 156/172 |
| 4,478,544 | 10/1984 | Strand | 411/34 |
| 4,478,545 | 10/1984 | Mizusawa et al. | 411/437 |
| 4,522,529 | 6/1985 | Conley | 403/343 |
| 4,581,263 | 4/1986 | Lukas | 428/36 |
| 4,620,401 | 11/1986 | L'Esperance et al. | 52/309.15 |
| 4,623,290 | 11/1986 | Kikuzawa et al. | 411/908 |
| 4,659,268 | 4/1987 | DelMundo et al. | 411/901 |
| 4,687,394 | 8/1987 | Berecz | 411/908 |
| 4,687,395 | 8/1987 | Berecz | 411/901 |
| 4,687,396 | 8/1987 | Berecz | 411/908 |
| 4,687,397 | 8/1987 | Berecz | 411/901 |
| 4,687,398 | 8/1987 | Berecz | 411/908 |
| 4,717,302 | 1/1988 | Adams et al. | 411/903 |
| 4,863,330 | 9/1989 | Olez et al. | 411/908 |

OTHER PUBLICATIONS

Advertisement by Tiodize Co., p. 29, Advanced Composites Nov./Dec. 1988.
Tough Composites Advance Aerospace Race, Engineering News.
AFWAL-TR-87-3085, Fastener/Joining Method for Carbon–Carbon Structures Multi-Directional Carbon–Carbon Fasteners, John W. Herrick, Sep. 1987.

*Primary Examiner*—Neill R. Wilson
*Attorney, Agent, or Firm*—David M. Ronyak

[57] ABSTRACT

A hollow composite internally threaded member such as a nut includes a reinforcing fabric layer such as a braided or knit layer extending in the axial direction of the member and conforming to its threads and an exterior cross-sectional configuration defined by a tubular braided triaxial fabric having axially extending elements of greater size than the remainder of the elements forming the triaxial fabric. A method of making such an internally threaded member comprises forming and embedding in a mtrix at least one reinforcing fabric layer and one triaxial fabric layer on an externally threaded cylindrical core and thereafter removing the core. Such internally threaded member may be threadedly joined and bonded to an externally threaded member of complementary thread pitch and thread diameter to form a bolt. The externally threaded member may comprise an elongate core having an integral tubular fabric layer bonded to its exterior surface.

18 Claims, 11 Drawing Sheets

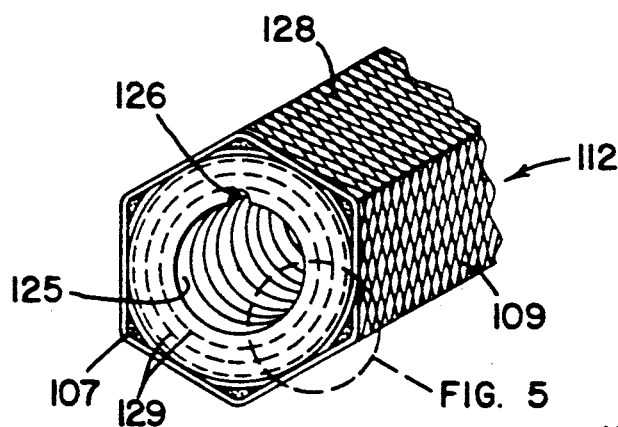
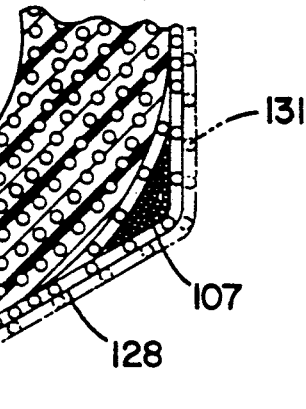
FIG. 5
FIG. 4
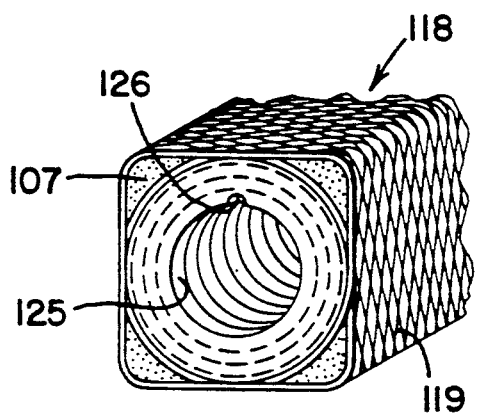
FIG. 6
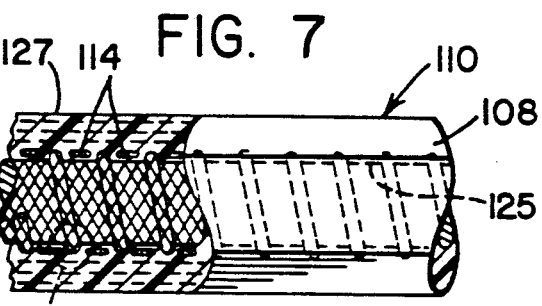
FIG. 7
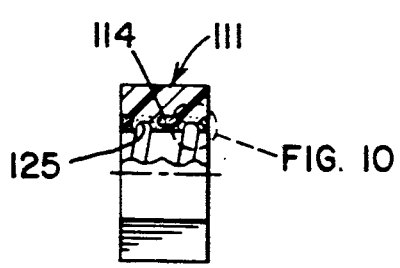
FIG. 9
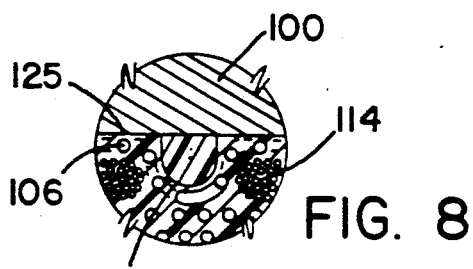
FIG. 8
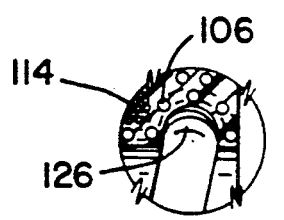
FIG. 10
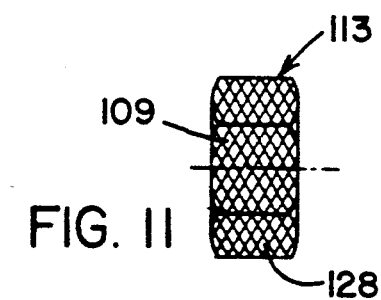
FIG. 11

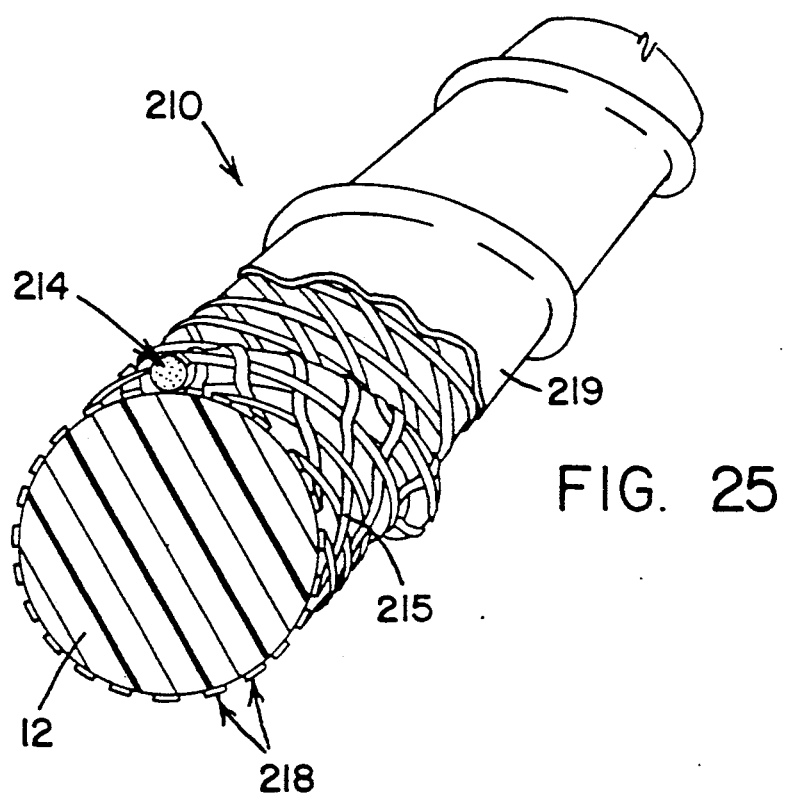

TRIAXIALLY BRAIDED COMPOSITE NUT AND BOLT

This invention relates to fiber reinforced, threaded members suitable for use as fasteners, and more particularly, threaded composite members which are reinforced with fibers extending in multiple directions with at least some of the fibers extending generally in the direction of the thread and other fibers extending generally in a direction such that they cross the thread and other fibers extending in the lengthwise or axial direction, and to a method of making same.

RELATED APPLICATIONS

This application is related to application Ser. No. 07/285,480 entitled BRAIDED COMPOSITE THREADED MEMBER, filed Dec. 16, 1988; application Ser. No. 07/285,482 entitled FIBER REINFORCED COMPOSITE THREADED MEMBER filed Dec. 16, 1988; application Ser. No. 07/285,483 entitled COMPOSITE BOLT AND NUT filed Dec. 16, 1988. now U.S. Pat. No. 5,033,925 and application Ser. No. 07/356,815 entitled CARBON/CARBON COMPOSITE FASTENERS filed May 25, 1989, the disclosures of which are incorporated herein by reference as if fully set forth herein.

BACKGROUND OF THE INVENTION

Fiber reinforced polymeric matrix composite strength-to-weight characteristics. Where it is desired to maximize these characteristics, carbon/carbon composite materials have been formed of carbon fibers such as those derived from PAN or pitch bonded by a matrix of pyrolytically formed carbon formed by pyrolysis of liquid resin impregnate or solid resin prepregnate or chemical vapor deposition or chemical vapor infiltration. While basic technology for the formation of such carbon/carbon composite materials has existed around for a considerable period of time, it is currently being researched intensively as the need for the outstanding performance characteristics of such composite materials becomes more widely recognized.

Currently, structural components of such composite materials are joined one to another or to structural composites of, for example. an airframe, employing other materials such as conventional metallic fasteners or adhesives. Conventional mechanical fasteners of metal are unsatisfactory for several reasons. They are subject to a weight penalty and are susceptible to galvanic corrosion. Vibrations encountered during normal flight conditions and severe loading as experienced in storms or emergency maneuvers may result in failure of the fastener to the composite structure joint. Where such carbon/carbon composite materials are to be exposed to extremes of temperature, the difference in coefficient of thermal expansion between such conventional mechanical fasteners and that of the carbon/carbon composite material leads to undesired compromises or under utilization of the properties of the carbon/carbon composite material or premature failure of such joint or limits the service conditions to which the combination can be exposed. While adhesives have been employed to join such carbon/carbon composites, such adhesively bonded joints cannot readily be disassembled for service and maintenance.

While attempts have been made to solve the aforestated deficiencies using composite fasteners, these earlier efforts have not been widely adopted due to economic or technical shortcomings.

Among such earlier efforts is a threaded plastic member, having a glass fiber reinforced thread in which a plurality of resin impregnated glass fiber reinforcing filaments are disposed in serpentine manner throughout the cross section of the thread and extending longitudinally of the axis of the threaded member which is manufactured using a precision mold having a cavity complementary to that of the member to be formed. A reinforced plastic rivet formed of carbon fibers encapsulated in an incompletely polymerized thermal resin matrix which in use is heated to soften the resin prior to upsetting of the rivet and full polymerization of the matrix has been proposed. Use of a parting medium or membrane such as rubber over a threaded fastener which functions as a pattern to manufacture a hollow casting mold has been proposed.

Impact resisting composites comprising multiple parallel filaments helically wrapped by a continuous multiple filaments or strips and embedded in a matrix material have been proposed.

Carbon/carbon composite mechanical fasteners have been formed by machining them from larger blocks of carbon/carbon material.

While an exhaustive search has not been conducted, it is evident from the foregoing that a need remains for a threaded composite fastener suitable for use with composite panel materials or structural members. A composite fastener which may be made economically in the absence of expensive molds is highly desired. A fastener which exhibits physical characteristics similar to modern composite materials such as those employed in aerospace applications and in harsh chemical environments is needed.

SUMMARY OF THE INVENTION

According to an aspect of the present invention, there is provided a method of making a hollow composite internally threaded member having an exterior cross-sectional configuration other than round comprising:

providing an elongate externally threaded cylindrical core;

forming on the core a reinforcing fabric layer enveloping the core and conforming to the thread of the core;

forming over the reinforcing fabric layer a tubular braided triaxial fabric having axially extending elements of greater size than the remainder of the elements forming the triaxial fabric;

embedding the reinforcing fabric layer and triaxial fabric in a matrix; and thereafter removing the core to provide a hollow composite internally threaded member.

According to another aspect of the invention, there is provided a hollow internally threaded member formed of fibers bound in a matrix, said member having an interior surface having an integral thread having a rounded apex, said thread including a reinforcing fabric layer extending in the axial direction of the member and conforming to the threads, said member having an exterior cross-sectional configuration other than round defined and reinforced by a tubular braided triaxial fabric having axially extending elements of greater size than the remainder of the elements forming the triaxial fabric.

According to a further aspect of the invention, there are provided various combinations of various hollow internally threaded members threadedly joined to various externally threaded members of complementary thread pitch and thread diameter. These may be bonded together with a matrix to form composite bolts.

There is no restriction on the type of fiber or matrix which may be employed in the construction according to the invention of composite threaded members of the invention.

The elongate externally threaded member may be solid or hollow. The elongate externally threaded member may itself be a composite member as described in co-pending application Ser. No. 07/285,480 filed Dec. 16, 1988 or in co-pending application Ser. No. 07/285,482 filed Dec. 16, 1988. The externally threaded member may contain a helical thread-defining element which contains a fibrous reinforcement or may be defined by a bundle of filaments, a braided or twisted cord or a matrix alone or in combination with one of the foregoing. The externally threaded member may include a braided layer thereon having at least one element of greater radial projection relative to its core than the remainder of the elements forming the braided layer, the element of greater radial projection defining a helical thread on the core.

The reinforcing fabric layer of the hollow internally threaded member may be braided or knit. Heat and pressure/vacuum may be applied subsequent to formation of the reinforcing fabric layer to effect consolidation of the fabric layer and associated matrix with the underlying threaded core. Provision of a release coating on the core prior to formation of the hollow internally threaded member enables separation of the completed internally threaded member from the core on which it is formed. No mold is required external of the internally threaded member, although a mold may be employed to achieve greater dimensional precision and density. The hollow internally threaded assembly upon the previously formed threaded core may be completed by curing/consolidating the fabric reinforced matrix internal threaded member upon the molding core in an autoclave.

The above and other features and advantages of the invention will become more apparent from the following detailed description and appendant claims taken in conjunction with the accompanying drawings in which like reference numbers are used to refer to like parts, which together form a part of the specification.

BRIEF DESCRIPTION OF THE DRAWINGS

FIG. 4 is an isometric view of a hexagonal internally threaded member according to the invention.

FIG. 5 is an enlarged sectional view of the encircled portion of FIG. 4.

FIG. 6 is an isometric view of an internally threaded member according to the invention having a square external cross-sectional configuration.

FIG. 7 is a side elevational view partly in section of a partially completed internally threaded member according to the invention with the externally threaded core partly withdrawn.

FIG. 8 is an enlarged sectional view of the encircled portion of FIG. 7.

FIG. 9 is a side elevational view partly in section, of a partially completed internally threaded member according to the invention cut from the member shown in FIG. 8.

FIG. 10 is an enlarged sectional view of the encircled portion of FIG. 9.

FIG. 11 is a hex nut cut from the hexagonal member of FIG. 4.

FIG. 25 is a perspective view with parts broken away of an alternate embodiment of an externally threaded composite member made in accordance with the invention.

DETAILED DESCRIPTION OF THE INVENTION

Figure 1A:
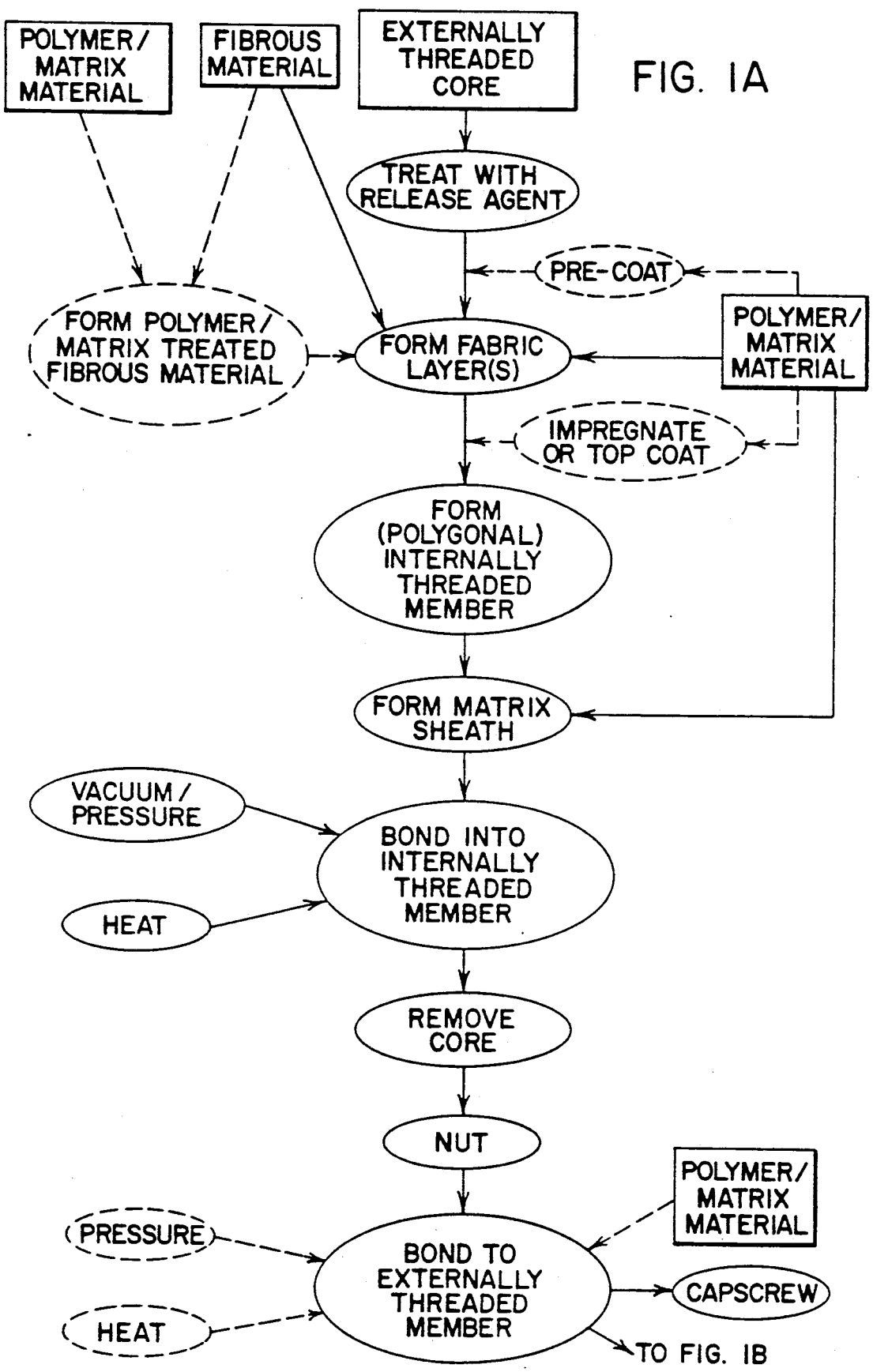
FIGS. 1A and 1B together form a flow chart depicting schematically in solid lines a preferred process and in dashed lines process variations and alternatives for the manufacture of certain embodiments of threaded composite members according to the invention.

As used herein, the terms having, including, comprising and containing are synonymous. Unless otherwise specified at the point of use, all percentages, fractions and ratios in this specification, including the claims appended thereto, are on a volume basis.

For purposes of illustration only, the following detailed description will focus at various places on polymeric matrix and/or carbon/carbon composite fasteners. It is to be understood, however, that the invention is not limited to any particular type of fiber or matrix.

Definition of Terms

A. "Rod" as used herein means a slender bar and may be hollow or solid.

B. "Thread Pitch" as used herein means the distance from any point on the helical thread of a threaded member to the corresponding point on the adjacent thread formed by that same helical member measured parallel to the longitudinal axis of the threaded member.

C. "Helix angle" as used herein means the acute angle formed by the path of a thread-defining helical element and the lengthwise direction of the threaded member. A greater helix angle corresponds to a smaller pitch for threaded members of equal core diameter and thread-defining element radial projection.

D. "Carbon fibers" as used herein refer to fibers produced by the heat treating of both natural and synthetic fibers of material such as, for example, wool, rayon, polyacrylonitrile (PAN) and pitch at temperatures on the order of 1000° C. or higher.

E. "Graphite fibers" as used herein refer to fibers produced by the heat treating of carbon fibers at graphitizing temperatures on the order of 2000° C. or more. Graphite fibers are a species of carbon fibers F. "Polymeric" as used herein refers to pure polymers, including homopolymers, copolymers, blends of different polymers, and blends of one or more polymers with particulate filler material including but not limited to ceramic material.

G. "Polygon" and related forms as used herein refers to a closed plane figure having three or more angles and sides.

H. "Pyrolytic material" as used herein refers to carbon or ceramic material that is deposited on a substrate by pyrolysis of a carbon precursor or ceramic precursor.

I. "Pyrolytic carbon" as used herein refers to carbon material that is deposited on a substrate by pyrolysis of a carbon precursor.

J. "Pyrolytic infiltration" as used herein is a term used to describe densification processing of porous fibers and particulate substrates. Common processes are chemical vapor deposition (CVD) and chemical vapor infiltration (CVI). Carbon and ceramic materials may be formed in situ using such processes.

K. "Carbonaceous" as used herein refers to a material containing or composed of carbon.

L. "Carbonizable" as used herein refers to organic material which, when subjected to pyrolysis, is converted to carbon.

M. "Ceramic" as used herein refers to inorganic nonmetallic materials.

N. "Matrix" as used herein refers to a material which binds together the reinforcing elements of a threaded member or binds two threaded members together. Matrix may be polymeric, carbon, glass or ceramic material or a precursor thereof such as a mixture or slurry or colloidal dispersion or an organometallic compound and the like.

MATERIALS-FIBER

The first component of fiber-reinforced composite fasteners according to the invention is fiber which is present in an amount from about 25 to about 70% by volume. The particular fiber chosen and the amount of fiber employed is dependent upon the properties sought in the completed composite fastener which will depend upon the intended application of the fastener, and the cost that the manufacturer is willing to incur in obtaining such properties. Use of greater quantities of fiber of the same structural properties will result in composite fasteners according to the invention having increased performance. Use of equal amounts of fibers having increased resistance to rupture and fatigue can be expected to result in composite fasteners having increased performance.

Suitable fibers include, by way of example and without limitation polymeric (including aramid), glass, metal, ceramic fibers and whiskers, and carbon fibers, and the like, including combinations thereof. Preferred are fibers of high Young's modulus such as those of aramid, glass and carbon. The fibers of the internally threaded member such as a nut and of externally threaded member such as a shank of a bolt should have a Young's modulus greater than that of the matrix in which they are embedded.

The fibers may be treated to enhance adhesion to the matrix. Such treatment is not within the scope of the present invention but is well known to those skilled in the manufacture of fibers for reinforcement of composites.

The fibers chosen must not be so brittle as to be largely destroyed during formation of the reinforcing fabric layer. Where greatest tensile strength and least weight is desired, the threaded member is preferably formed of axially extending continuous fibers bonded with a matrix. Where greatest tensile strength is desired, the fibers must have a minimum length at least equal to that required to achieve full bond strength to the matrix to avoid pullout during tensile loading. The axially extending fibers preferably extend in the lengthwise direction of the core of the externally threaded member. In many applications, however, the fastener will be subjected mainly to shear loading rather than tensile loading. In these applications, staple fibers may be adequate Tows of continuous fibers or staple fibers or blends of staple and continuous fibers may be employed. In the latter instance the staple is arranged to form a yarn or tow for use in the manufacturing processes.

The diameter of the fibers is believed to not be critical. Typically commercially available fibers of glass, aramid, and carbon sold for use in composites are believed to be suitable for use in the invention.

Typically commercially available carbon fibers sold for use in the manufacture of carbon/carbon composites range in diameter from about 4 to about 10 microns. All are deemed suitable for use in the invention. However, pitch-based carbon fiber having a 10 micron diameter may be difficult to form around corners such as those encountered in forming a fabric reinforcing layer overlying a thread-defining element While any carbon fiber, including graphite fiber may be employed, is preferable to use carbon fiber prepared from PAN (polyacrylonitrile) or pitch. Examples of suitable fibers include those available from Courtaulds-Grafil under the brand name GRAFIL XAS, from Hercules, Inc. under the brand names AS-4, HMS, UHMS (PAN-base), from Amoco Performance Products, Inc. under the brand name THORNEL T-300 (PAN-base) and P-25 (Pitch-base), from BASF under the brand name CELION (PAN-base), and from E. I. duPont deNemours & Company types E-75 and E-100 (Pitch-base). The denier of the fiber preferably ranges from 250 to 3000. A single fastener may contain more than one fiber type. A single reinforcing fabric layer of a fastener may contain more than one fiber type.

MATERIALS-MATRIX

The second component of composite fasteners according to the invention is a matrix.

Selection of the matrix and fabric materials for an internally threaded member such as nut 113 and an externally threaded member such as shank 121 is based primarily on intended end use according to the in-service properties required for the intended application. In low temperature and low stress applications, it is adequate to utilize a thermoplastic matrix such as, by way of example and without limitation, nylon. Where greater strength and Young's modulus is desired or necessary, a polymer matrix may be filled with discontinuous or continuous fibers. Crystalline polymers are generally more resistant to creep than non-crystalline polymers. Where even greater strength and resistance to creep are desired, the threaded member may be formed of thermosettable polymeric matrix which is reinforced with continuous fibers which extend in the axial, that is the lengthwise direction of, for example, externally threaded shank 121. Suitable matrices include, by way of example and without limitation, nylons (polyamides), polyesters, polyolefins, polyaroline sulfides (PPS), epoxies, polyimides, and the like.

Matrix materials which set by chemical action alone without application of heat may also be employed The matrix employed in the manufacture of the internally threaded member such as nut 113 which is to be joined with a composite shank such as 121 to form a bolt or capscrew 120 is selected so as to be compatible with the matrix employed in the manufacture of such shank.

It is also possible to utilize polymeric matrix materials which may be B-staged. Polyesters, epoxies and phenolics are examples of such materials. In this instance an optional process for formation of items such as bolt 120 depicted in FIGS. 12 through 15 includes only B-staging the internally and externally threaded members respectively such as the nut 113 and shank 120 prior to threadedly joining them and thereafter applying heat and pressure to consolidate the internally threaded member to the shank and effect bonding therebetween.

Carbon, ceramic, glass, precursor of carbon, precursor of ceramic, and precursor of glass may also be used for the matrix. Different matrix materials may be employed in a single threaded member.

INTERNALLY THREADED MEMBER AND MANUFACTURE

In FIGS. 7 through 10, there are shown embodiments of partially completed internally threaded members 110 and 111 respectively according to the invention. Hollow internally threaded member 110 is formed of a fiber-reinforced matrix. The interior surface 125 of threaded member 110, 111 includes an integral thread 126 having a rounded apex. The thread 126 includes a reinforcing fabric layer 106 which extends in the axial direction of internally threaded member 110, 111 and conforms to the contour of the internal thread 126 thereof.

In FIGS. 9 and 10 there is shown an internally threaded member 111 like that shown in FIG. 7, the difference being that the member 111 has been sliced from a greater axial length element such as member 110 and core 100 is removed. The exterior axially extending surfaces of members 110 and 111 are cylindrical.

FIGS. 4, 5 and 11 respectively show a hexagonal internally threaded member 112 and nut 113 which in other respects are like members 110 and 111. The interior surface 125 in members 110, 111, 112, 113 includes a helical thread 126 extending in its lengthwise or axial direction. Thread reinforcing fabric layer 106 is undulate and conforms to and extends throughout the contour of the threaded interior surface 125 of member 110, 111, 112 and 113. The reinforcing fabric layer 106 is preferably a continuous tubular fabric layer formed in the manner shown in FIG. 19 by braiding or knitting suitable high modulus fibers. Preferred are fibers of high Young's modulus such as those of aramid, glass and carbon and the like. Each of the six corners of hexagonal member 112 and 113 are defined and reinforced by a heavy axially extending tow 107 which is a part of a triaxial braided fabric layer 109.

In FIG. 6 there is shown an internally threaded member or nut 118 having a square external cross-sectional configuration. Square nut 118 in other respects is like members 110, 111, 112, 113 and includes a helical interior thread 126 extending in its lengthwise or axial direction. The four corners of square nut 118 are defined and reinforced by four heavy axially extending tows 107 which are a part of a triaxial braided fabric. In FIGS. 12, 13, 14, and 15 there is shown a composite bolt 120 according to the present invention which has been formed by threadedly joining a internally threaded member such as nut 113 to a separately formed externally threaded composite member 121 which may have been formed in the manner described in co-pending applications Ser. Nos. 07/285,480 and 07/285,482, respectively, both filed on Dec. 16, 1988. Hexagonal nut 113 is threaded on to threaded shank 121 and is bonded with matrix 122 to prevent further rotation of nut 112 relative to shank 121, thereby producing a bolt or capscrew. Bonding is accomplished with polymeric material such as epoxy or other matrix material which is compatible with the matrices of nut 113 and shank 121. Where a carbon/carbon or ceramic bond is to be established, a matrix precursor is employed and is subsequently converted to final form in known manner.

Figure 1B:
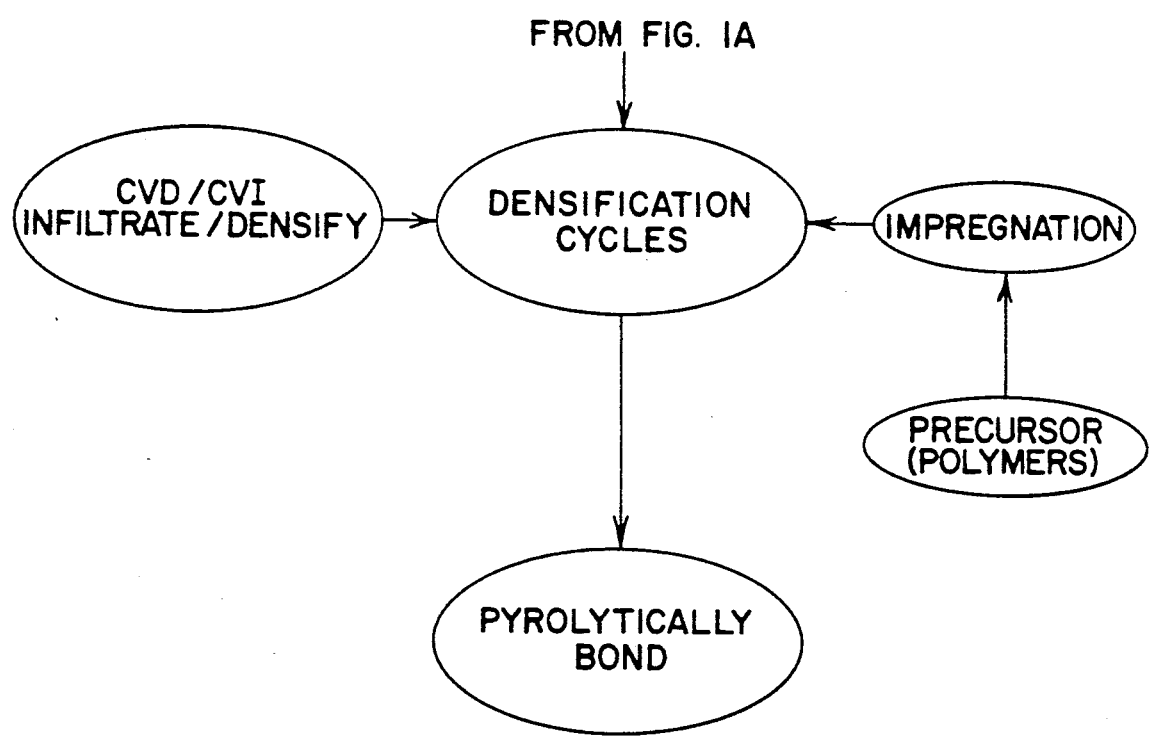
Figure 2:
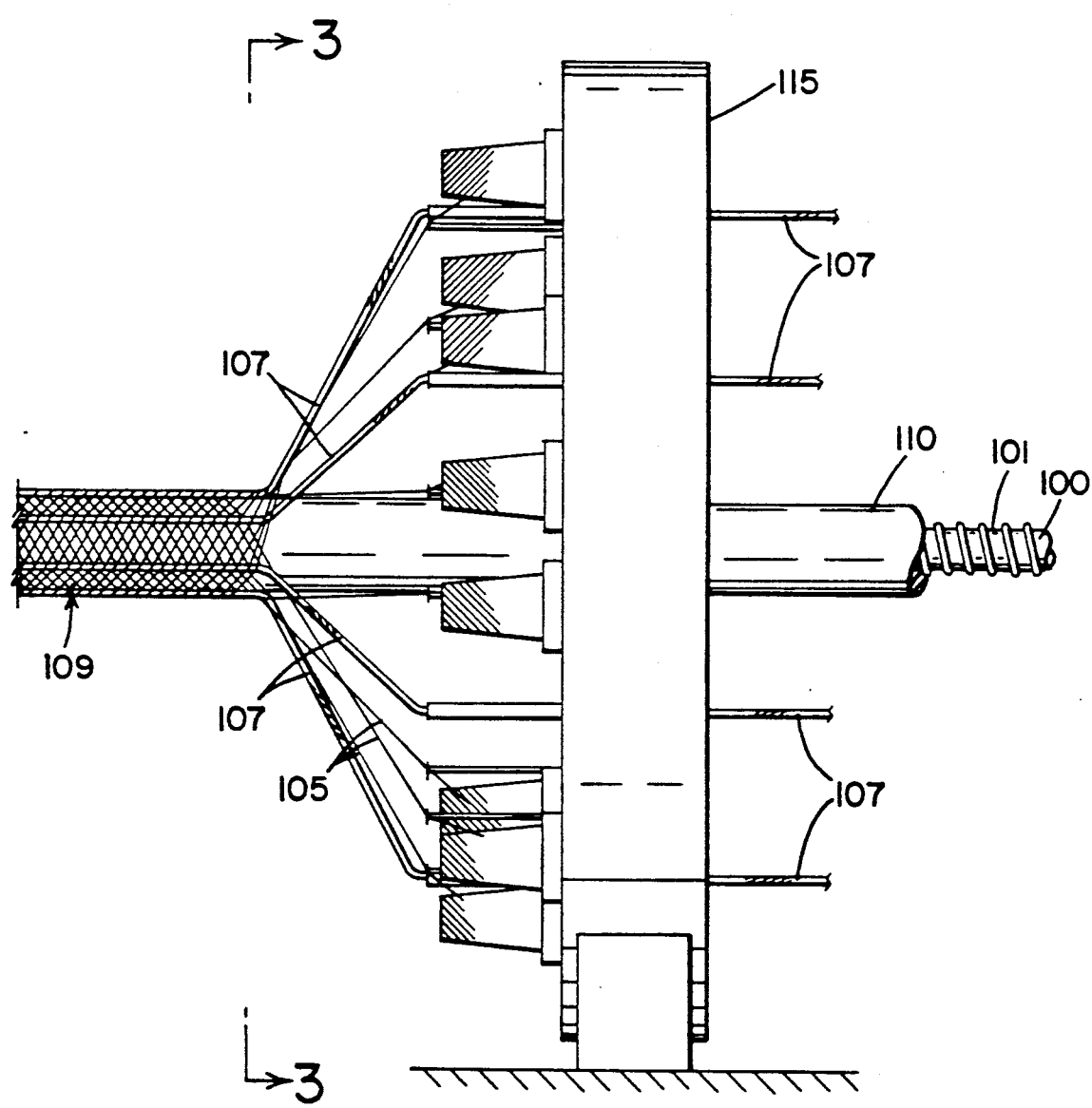
FIGS. 2 and 3 are respectively a side view schematic and an end-on schematic depicting manufacture of an externally threaded member according to the invention.
Figure 3:
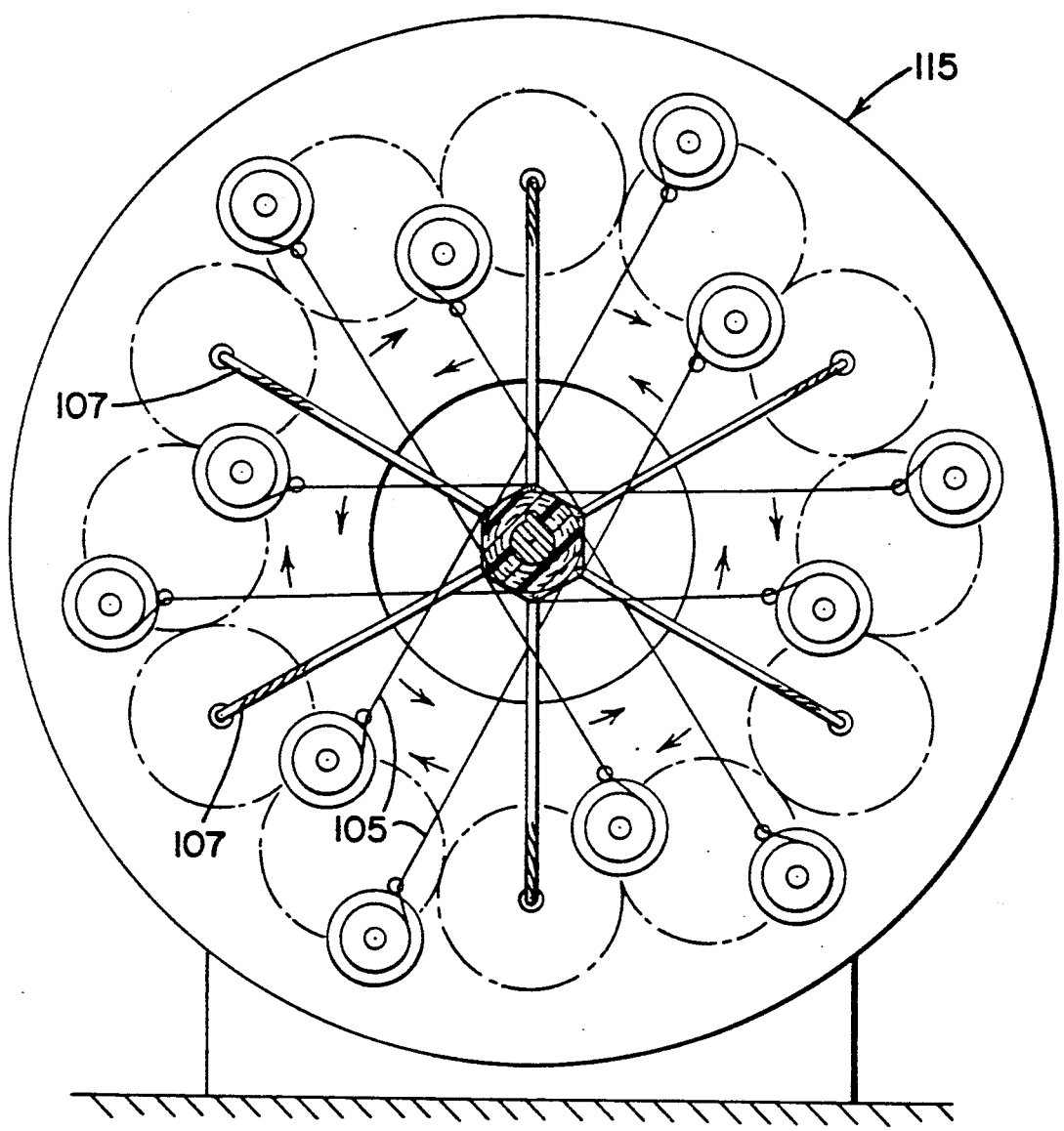
Figure 12:
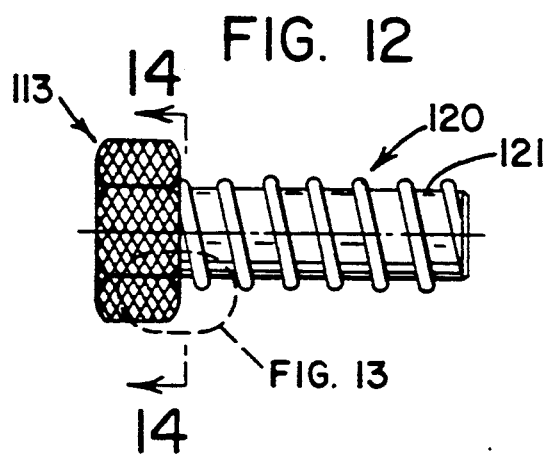
FIG. 12 is a side elevational view of a composite bolt according to the invention.
Figure 17:
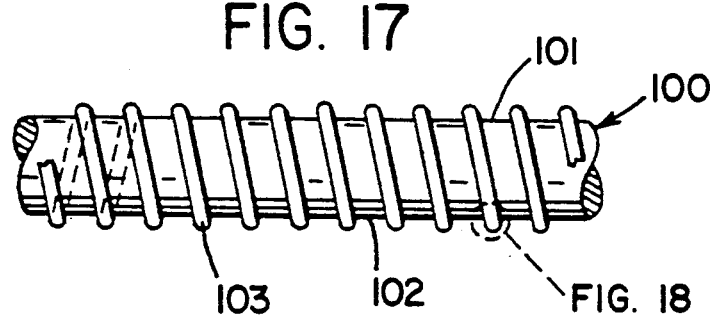
FIG. 17 is a side elevational schematic view of an externally threaded cylindrical core for use in manufacturing an internally threaded member according to the invention.
Figure 18:
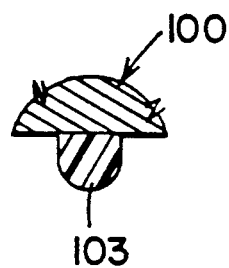
FIG. 18 is an enlarged sectional view of the encircled thread portion of FIG. 17.
Figure 19:
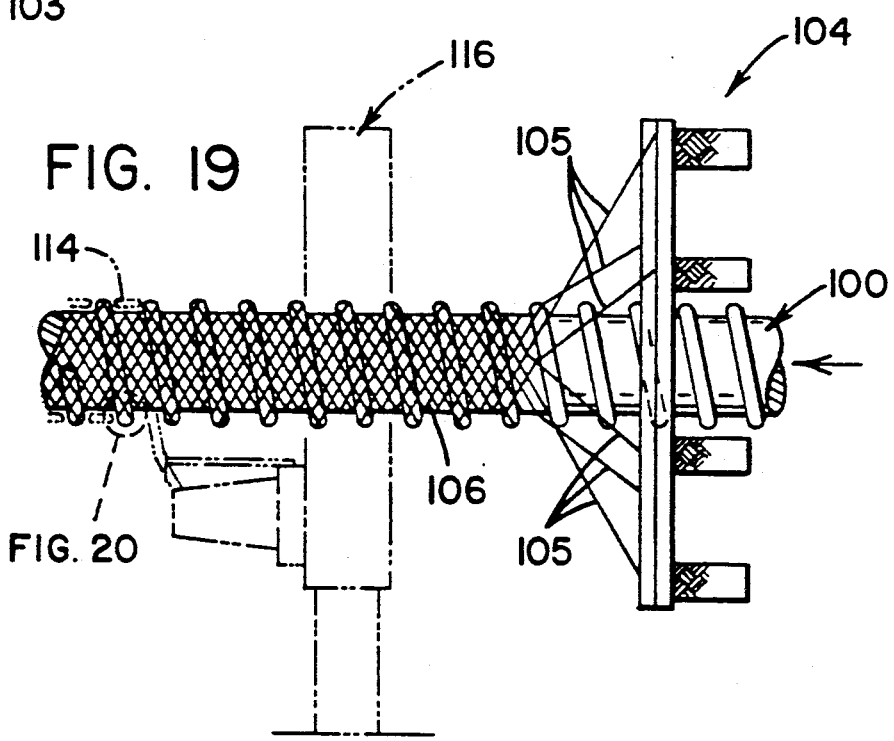
FIG. 19 is a side elevational schematic view depicting formation of the radially innermost reinforcing fabric layer of an internally threaded member according to the invention.

In FIGS. 1 through 3 together with FIGS. 17 through 20 there is shown a manner of manufacture according to the invention of an internally threaded member according to the invention. An externally threaded cylindrical core such as core 100 depicted in FIGS. 17 and 18 is used as a carrier and mold for formation of an internally threaded member such as member 110 depicted in FIGS. 4 through 11. Core 100 must include an exterior surface 101 which will not bond to the internally threaded member to be formed except where it is desired to form directly a threaded bolt or the like such as that depicted in FIG. 12. The exterior surface 101 of externally threaded cylindrical core 100 is treated with release agent 102 as shown in FIG. 1 and FIG. 17. Where core 100 is merely a mandrel used in production of internally threaded members of the invention, the core may be formed of any suitable material including wood, plastic or metal, or a composite externally threaded member of the invention. An eminently suitable core for internally threaded fasteners is a wooden dowel that has been machined to produce helical thread such as thread 103 in FIG. 17. The wooden core may be wrapped with thin (e.g. 1 mil) PTFE tape as a release agent. Such PTFE tape is not needed when making carbon or ceramic matrix internally threaded members because the wooden core shrinks away during subsequent high temperature processing. One or more reinforcing fabric layers are formed on core 100. This is preferably accomplished as shown in FIG. 19 by passing core 100 through a tubular braiding or knitting machine or succession such machines. Braiding or knitting machine 104 is provided with a plurality of carriers each letting off a continuous tow of fibrous material 105 which is laid up into a tubular reinforcing fabric layer 106 on core 100. The reinforcing fabric layer 106 envelopes and conforms to the contours defined by the helical thread 103 of the outer surface 101 of core 100.

The reinforcing fabric layer 106 is multidirectional in character; it has fibrous elements which extend at differing angles relative to the axial direction of the internally threaded member being formed, at least some of the fibrous elements extending generally in the same directional sense as the helical thread(s) and others of the fibrous elements extending generally in a directional sense opposite to that of the helical thread(s) so as to frequently cross the helical thread(s). In certain preferred embodiments, the internal thread of the hollow member is reinforced with closely spaced fibers which extend axially of the member in opposite sense helices. Axially extending fibrous elements may also be included in the thread-reinforcing fabric layer.

A sheath or covering of matrix material 108 is applied to the combined externally threaded core and fabric layer 106. Matrix material may be precoated onto the fibrous material 105. Such fibrous material 105 may alternatively be coated or impregnated with matrix or matrix precursor material prior to or subsequent to conversion into fabric layer 106 on the core 100.

Figure 20:
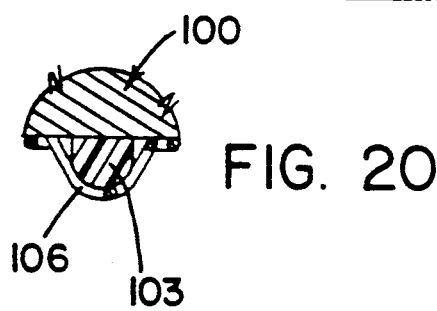
FIG. 20 is an enlarged sectional view of the encircled thread portion of FIG. 19.

While the formation of a single reinforcing fabric layer 106 is depicted in FIGS. 19 and 20, a plurality of reinforcing fabric layers such as layers 129 in FIGS. 4 through 6 is desirably sequentially formed, each upon the preceding underlying reinforcing fabric layer, to provide an internally threaded member of greatest strength. Matrix material may be applied between application of each successive reinforcing fabric layer. Alternatively, matrix material may be applied subsequent to application of all of the reinforcing fabric layers such as by pressure/vacuum impregnation. When applied, the matrix material, if a liquid, must be of sufficient viscosity to remain with the fibrous material and not drip off the combined internally threaded member being manufactured and its underlying core. To avoid the tendency of the liquid matrix material to run due to influence of gravity, the core and internally threaded member being manufactured may be rotated about the horizontally oriented longitudinal axis of the core 100.

In certain preferred embodiments, following formation of the radially innermost thread reinforcing layer 106, a heavy fibrous filler tow 114 of larger size than the remainder of the fibrous elements forming the innermost thread reinforcing layer is wrapped helically under tension to fill the valley area between the successive helical thread turns of the core 100 and provide a nearly cylindrical surface prior to formation of additional coaxial reinforcing fabric layers 129 each upon the preceding underlying reinforcing fabric layer. This may be accomplished manually or through use of a spiral wrap machine such as machine 116 shown in dashed lines in FIG. 19. As an alternative, heavy fibrous tow 114 may be applied following formation of one or several of additional reinforcing layers 129. The distance between successive turns of fibrous filler tow 114 corresponds to the thread pitch of the internally threaded member being formed. The turns of fibrous filler tow 114 are offset in the axial direction of the internally threaded member being formed relative to turns of its internal thread. Heavy fibrous filler tow 114 fills the area between successive helical thread turns of the internally threaded member being formed and reinforces its thread.

After application of the layers desired to build up the internally threaded member has been attained, a plurality of continuous heavy tows of fibrous material 107 are as shown in FIGS. 2 and 3 introduced axially while simultaneously forming a braided fabric layer 109 hereafter referred to as a triaxial braided fabric. These axial members 107 are of larger size than the remainder of the fibrous members 113 forming the triaxial braided layer 109. As shown in FIGS. 2 and 3 introduction of six axial tows 107 spaced equally circumferentially results in formation of an internally threaded member like member 112 as shown in FIGS. 4 and 5 having a hexagonal exterior surface 128. As shown in FIG. 6, use of four heavy axial tows 107 spaced equally circumferentially results in formation of an internally threaded member 118 having four sided exterior surface. Polygonal shapes having a greater or lesser number of sides may be produced by introducing a corresponding number of axial tows.

Figure 16:
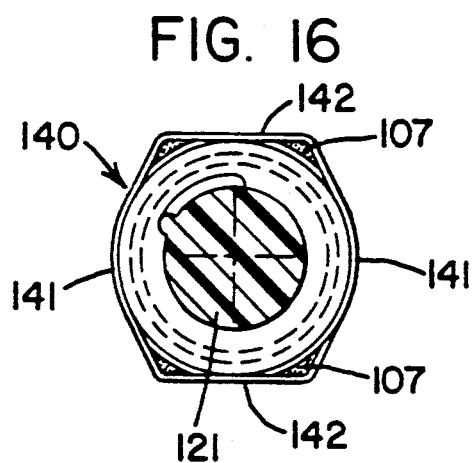
FIG. 16 is a cross-sectional view of an alternate embodiment of a composite bolt according to the invention.

Axial tows of differing sizes positioned circumferentially around the internally threaded member being formed can be selectively introduced so as to form nuts having other than polygonal shapes. For example, a nut 140 having the cross-sectional shape illustrated in FIG. 16 may be produced by introducing two groups each comprising a plurality of closely circumferentially spaced heavy axially extending tows 107 to form the arcuate portions 141 and straight portions 142.

By shifting the position of the four heavy axial tows 107 in FIG. 6 to be other than equally spaced circumferentially, the triaxial fabric may contain two circumferentially spaced groups of closely spaced axially extending elements of greater size than the remainder of the elements forming the triaxial fabric. An internally threaded member 140 results whose external cross-sectional configuration is a closed figure consisting of arcuate portions 141 joined by straight portions 142 as shown in FIG. 6. The head of nut 140 includes diametrically opposite flatted areas 142 adapted for engagement with a torque-transmitting tool such as a wrench. It is also possible that a group of closely circumferentially spaced axially extending heavy tows will define and underlie the arcuate portions 141 rather than the straight portions 142, depending on the relative sizes of the fibrous elements forming the triaxial fabric layer and the underlying threaded member.

After application of the final layer matrix material which encapsulates and forms a sheath 108 upon the underlying reinforcing fabric layer such as 106, the assembly is preferably subjected to heat and vacuum/pressure to consolidate and bond the matrix and the fabric layers into a unitary, stable, internally threaded composite member such as any of the members shown respectively in FIGS. 4 through 11. This may be accomplished in an ordinary autoclave when thermosettable polymeric resins are employed. The part being manufactured is preferably wrapped in a protective film such as PTFE and/or may be placed in a vacuum bag prior to placement in the autoclave or oven. Autoclaving may also be employed with thermoplastic polymeric resins. No external mold is required When room temperature chemically setting resins are employed, it is possible to manufacture internally threaded members according to the invention without application of heat or pressure.

Subsequent to the bonding operation, the combined internally threaded member and its core are removed from the autoclave, thereafter the newly formed internally threaded member 112, 113, 118 is removed from core 100 by rotating member 110 relative to core 100. As shown in FIG. 7, core 100 has been partially withdrawn from the right hand portion of internally threaded member 110 Previously applied release agent 102 facilitates separation of internally threaded member from core 100.

Preferably, internally threaded member 110 is made of sufficient axial length to facilitate passage through triaxial braider 115 and such that it may thereafter be cut into a plurality of smaller axial dimension internally threaded members such as internally threaded member 113 shown in FIG. 11. The exterior cylindrical surface 127 of member 110 is converted by the introduction of axially extending tows 107 to a hexagonal outer surface 128 such as that shown for member 112 in FIGS. 4 and 5. Elongate hexagonal internally threaded member 112 of FIG. 4 is thereafter sliced into a plurality of hex nuts such as nut 113 shown in FIG. 11. As shown in FIGS. 4 and 10, hex nut 113 includes within its central aperture a continuous helical thread 126 extending in the axial direction of nut 113. Internal helical thread 126 is reinforced by reinforcing fabric layer 106 which conforms to the contour defined by external helical thread of core 100. As shown in FIGS. 4 and 5, nut 113 includes a plurality of coaxial fabric reinforcing layers 129 distributed throughout its cross-sectional area, the outermost layer being a triaxial braided layer 109 with six heavy axially extending tows 107 equally spaced about the circumferential direction of the nut resulting in its hexagonal exterior surface 128.

In certain preferred embodiments, additional fabric layers such as layer 131 shown in dashed lines in FIG. 5 may be formed over the triaxial braid layer 109 which includes the heavy axially extending tows to further reinforce and enlarge the established polygonal or other non-round shape of the exterior surface of the internally threaded member being manufactured Although it is possible to achieve a polygonal shape by judicious use of heavy axially extending tows in successively applied fabric layers or to separately apply heavy axial tows then apply a reinforcing fabric layer, these methods are not recommended because of difficulty of keeping the axially extending tows in proper radial alignment. Their introduction in a single triaxial braided layer in the manner illustrated in FIGS. 2 and 3 is much preferred and wholly adequate to obtain a nut having a polygonal or other non-round exterior adapted to facilitate transfer of torque from a wrench.

Figure 13:
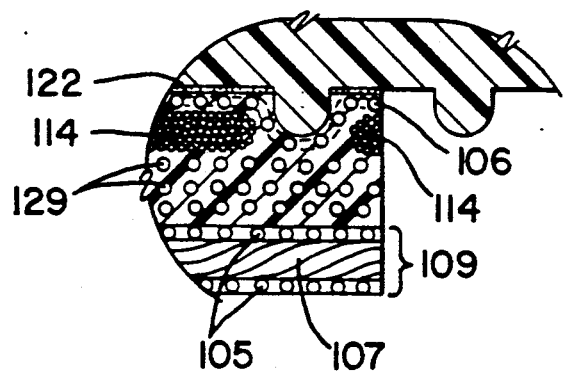
FIG. 13 is an enlarged sectional view of the encircled portion of FIG. 12.
Figure 14:
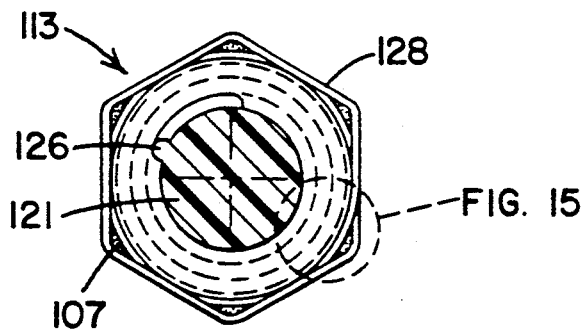
FIG. 14 is an enlarged cross-sectional view taken along lines 14—14 of FIG. 12.
Figure 15:
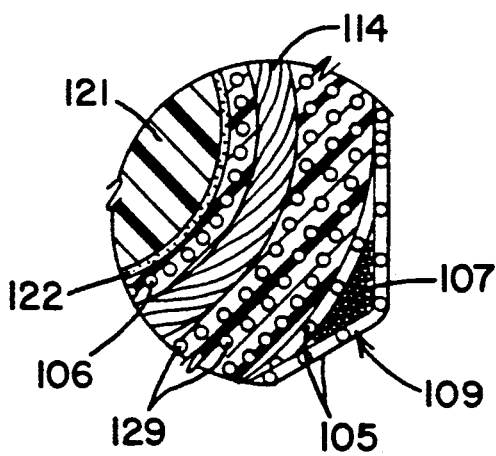
FIG. 15 is an enlarged cross-sectional view of the encircled portion of FIG. 14.

Nut 113 may be threadedly joined to an externally threaded composite member such as shank 121 shown in FIGS. 12 through 15. The manufacture of composite shank 121 is described in detail in co-pending applications Ser. Nos. 07/285,480 and 07/285,482 filed Dec. 16, 1988. As best illustrated in FIGS. 13 and 15, nut 113 is bonded to shank 121 with polymeric material such as an epoxy adhesive or other matrix material 122 to form composite bolt 120.

Where greatest strength and resistance to creep are desired, the core of shank 121 is preferably formed of matrix which is reinforced with continuous fibers which extend in the axial, that is the lengthwise direction of shank 121.

A particularly suitable core for externally threaded shank for applications where high modulus and strength are desired is a rod formed of glass fiber or carbon fiber in a polyphenylene sulfide matrix, which rod is available under the trademark RYTON PPS from Phillips Petroleum Company, Bartlesville, Okla.

The fibrous material tow 105 which is utilized to form the reinforcing fabric layer 106 may itself be formed of a plurality of sub-elements such as filaments of generally rounded cross-sectional configuration. The filaments may be encapsulated with matrix. The filaments may be twisted together into a yarn. A plurality of may be twisted into a cord. A plurality of cords may be twisted to form a larger continuous fibrous material element. Fibrous material 105 may be of flattened or rounded cross-sectional configuration and may be twisted or untwisted or braided. Preferably, either fibrous material tows 105 are impregnated with matrix material prior to forming into reinforcing fabric layer 106 or are laid onto a previously applied layer of matrix material such as polymeric material, preferably liquid material which wets the fibers and encapsulates them. Tows 105, 107 may be painted with matrix material after being formed into reinforcing fabric layer 106, 129 and triaxial braid layer 109, and additional fabric layer 115.

Due to the character of the reinforcing fabric layer 106 and the fact that it is undulate and thus closely conforms to the male pattern provided by the threaded core 100, the internal threads of female member 110 and those derived therefrom are reinforced against rupture. Due to the multi-directional character of the filaments of the reinforcing fabric layer, at least some of the filaments of the reinforcing material are oriented in planes at a considerable angle to the plane of the shearing forces acting on the internal threads of member 110 and those derived therefrom such as internally threaded members 112, 113, 118, 140. Reinforcing fabric layer 106, 129 may additionally include circumferentially spaced axially extending tows of a size generally corresponding to that of the remainder of the fibrous material tows 105 forming the fabric layer 106,129.

EXTERNALLY THREADED MEMBERS AND THEIR MANUFACTURE

There are two principal methods by which an externally threaded member such as composite shank 121 may be prepared: (1) including a thread-defining element in a braided fabric layer and (2) application of a helical thread-defining element followed by application of a reinforcing fabric layer which overlies the thread-defining element.

Figure 24:
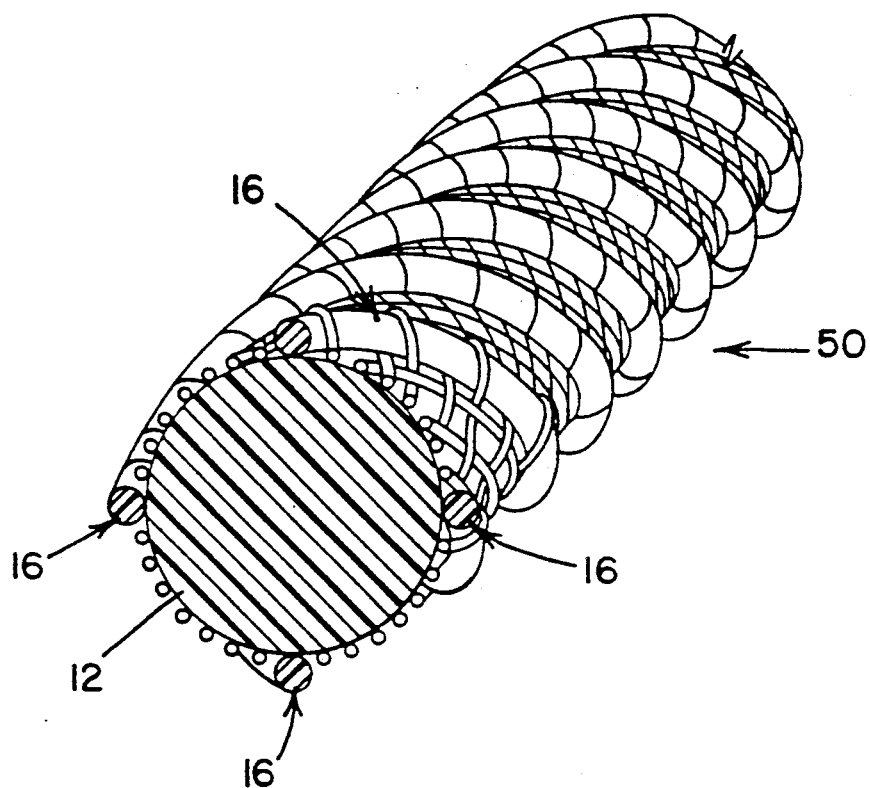
FIG. 24 is isometric view of an alternate embodiment of an externally threaded member according to the invention.
Figure 27:
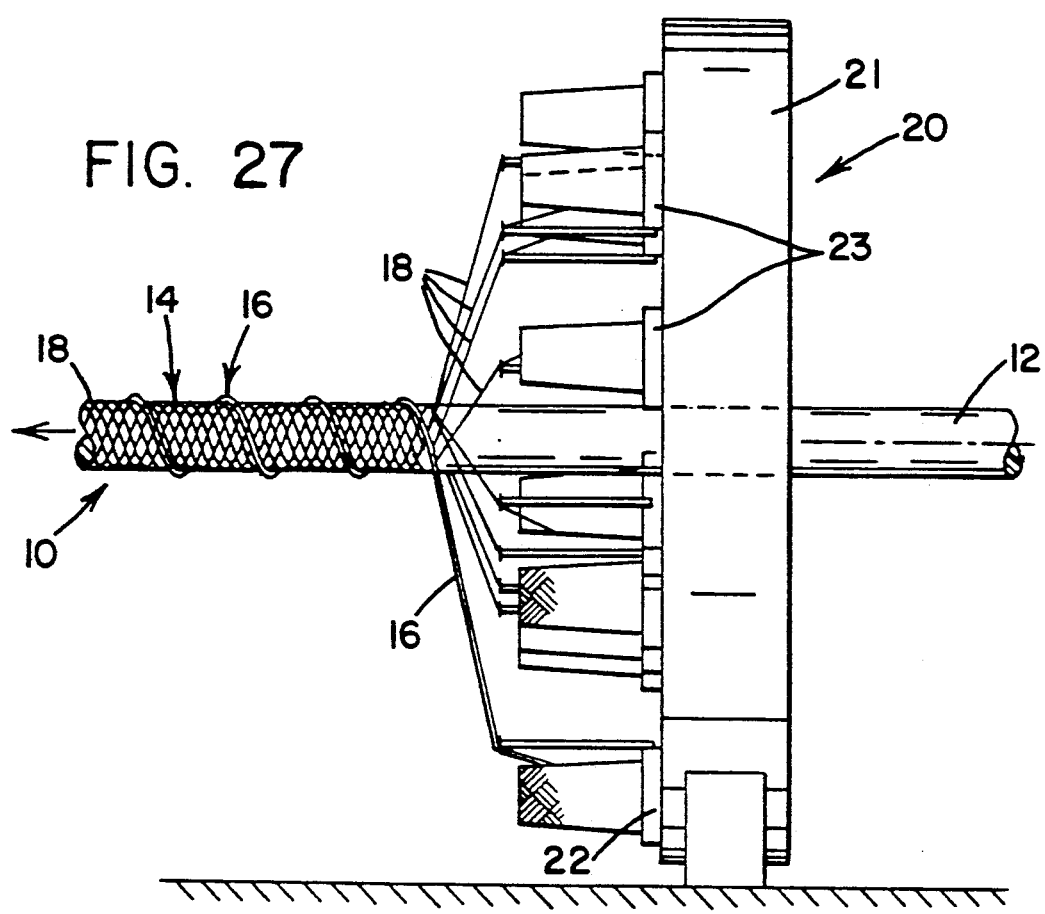
FIG. 27 is a side view schematic depicting manufacture of an externally threaded member according to the invention.
Figure 23:
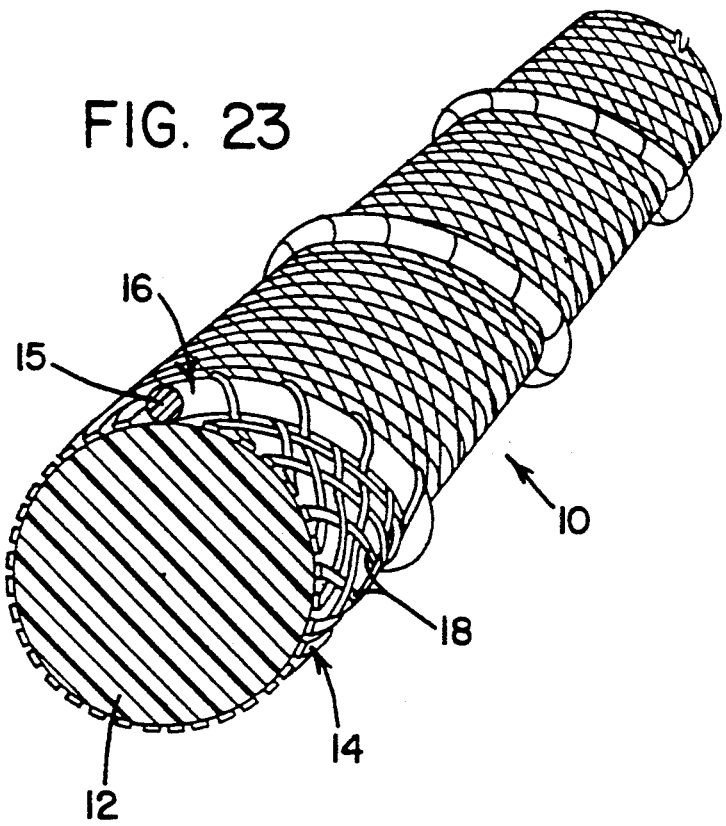
FIG. 23 is a perspective view of an externally threaded composite member made in accordance with the invention.

FIGS. 23, 24 and 27 depict various embodiments of and the manufacture of externally threaded composite members according to the present invention via braiding operations.

Figure 21:
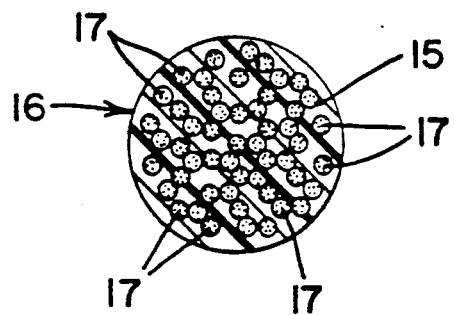
FIG. 21 is a cross-sectional view of a preferred thread-forming element useful in the invention.
Figure 22:
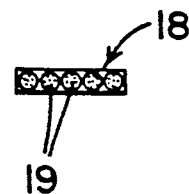
FIG. 22 is a cross-sectional view of a preferred non-thread-forming element useful in the invention.

In FIG. 23, there is shown an embodiment of an externally threaded member 10 according to the invention. Threaded member 10 includes an elongate core 12 and a tubular braided layer 14 bonded to the exterior surface of the core 12. In certain preferred embodiments braided layer 14 is embedded in a matrix (not shown for clarity of illustration). Braided layer 14 includes a thread-defining element 16 which extends in helical fashion around and along the exterior cylindrical surface of core 12. Thread-defining element 16 is also an integral part of tubular braided layer 14. Thread-defining element 16, one of which is illustrated in FIG. 21, is of greater radial projection relative to core 12 and the central longitudinal axis of the threaded member than that of the other non-thread-defining elements 18, one of which is illustrated in FIG. 22, which together with element 16 form the tubular braided layer 14.

For a thread-defining element of a given size, the helix angle of the thread(s) varies directly with the size of the core. For a core of a given diameter, the helix angle of the thread-defining element varies inversely with the size of the thread-defining element. Helix angle of the thread-defining element(s) will generally range between 50 and slightly less than 90 degrees. The helix angle selected will be based on the materials employed in the manufacture of the fastener, the packing density of the fastener and the design requirements of the intended application for the fastener.

The core 12 is a rod and is preferably cylindrical although other cross-sectional configurations may be used such as hexagonal and those polygons having a greater number of sides or oval. The core 12 may be solid as illustrated in FIG. 23 or hollow. Selection of the core is based primarily on intended end use of the externally threaded member according to the in-service properties required for such application. In low temperature and low stress applications, it is adequate to utilize a core formed of extruded thermoplastic such as, by way of example and without limitation, nylon. Where greater strength and Young's modulus is desired or necessary, the polymer matrix may be filled with discontinuous or continuous fibers. Where greatest strength and resistance to creep are desired, the core is preferably formed of a matrix which is reinforced with continuous fibers which extend in the axial, that is, the lengthwise direction of the core. The core may include one or more layers of braided, including triaxially braided, or knit fabric or at least two layers of opposite sense helical fibrous reinforcements to render the core resistant to torsional loading and/or fibrous reinforcements which extend in lengthwise, that is, the axial direction of the core.

A particularly suitable core for applications where high modulus and strength are desired is a rod formed of glass fiber or carbon fiber in a polyphenylene sulfide matrix. Such rod is available under the trademark RYTON PPS from Phillips Petroleum Company, Bartlesville, Okla.

Thread-defining element 16 may be formed of any suitable fiber including those listed above in regard to the Core 12 and an internally threaded member such as nut 113. Preferred are fibers of high Young's modulus such as those of aramid, glass, carbon and ceramic. The fibers may be treated to enhance adhesion to the matrix. Such treatment is not within the scope of the present invention but is well known to those skilled in the manufacture of fibers for reinforcement of composites.

As shown in FIG. 21, the thread-defining element 16 may itself be formed of any suitable fiber of a plurality of sub-elements 17 such as filaments' of generally rounded cross-sectional configuration. The filaments 17 may be encapsulated or impregnated with matrix 15. The filaments 17 may be twisted together into a yarn. A plurality of yarns may be twisted into a cord. A plurality of cords may be twisted to form a larger thread-defining element. A plurality of bundles of filaments or a plurality of yarns or a plurality of cords may themselves be braided to form a thread-defining element. A strip of material may be twisted to form thread-defining element 16 or sub-element 17. The thread-defining element 16 should be resistant to deformation from its rounded cross-sectional configuration to ensure that element 16 projects radially outwardly from core 12 an amount greater than the remainder of the elements 18 of the braided layer 14. In certain preferred embodiments thread-defining element 16 is of circular cross-sectional configuration prior to application to core 12 and resistant to deformation from such cross-sectional configuration as it is braided onto core 12. This may be achieved by forming element 16 of twisted or tightly compacted fibers and/or pre-impregnating the sub-elements 17 with polymeric or other matrix 15 to form a solid circular bundle. Following application to the core, thread-defining element 16 may be approximately of D-shaped cross-sectional configuration, being deformed slightly where it is brought into contact with the core.

As shown in FIG. 22, the non-thread-defining elements 18 of braided layer 14 are preferably of flattened cross-sectional configuration. The non-thread-defining elements 18 may be formed of any suitable fiber twisted or untwisted, formed into yarn or cord or braided into a flattened strip. The non-thread-defining elements may be encapsulated or impregnated with matrix material prior to forming braided layer 14. As shown in FIG. 22, a plurality of filamentary sub-parts 19 are positioned side-by-side in non-thread-defining element 18.

In FIG. 24, there is shown an alternate embodiment of an externally threaded member 50 according to the present invention. Externally threaded member 50 differs primarily from that depicted in FIG. 23 in that it includes a plurality of thread-defining elements 16, each of which extends helically along core 12. Threaded member 50 retains a significant portion of its holding power in the event that one or more of its thread-defining elements 16 are damaged or broken. While four thread-defining elements 16 are illustrated, a greater or lesser number could be employed A portion of the manufacturing process for the externally threaded members 10 and 50 is illustrated in FIG. 27. A conventional tubular braiding apparatus 20 (which may be identical to apparatus 115 shown in FIG. 2 or apparatus 104 shown in FIG. 19 although heavy axial tows are not employed) contains a desired number of yarn or cord carriers in its deck 21. The number of carriers is not critical. The number of carriers needed for complete coverage of the surface of the core increases with the size of the core in a manner well known to those skilled in the art of tubular braiding. For fasteners of up to about 1" (2.54 cm) diameter, commonly available twenty-four to thirty-six unit single deck braiding machines may be employed to obtain full coverage of the core 12 with braided layer 14. According to the invention, one or more selected carriers 22 are fitted with a spool of thread-defining element 16, one being shown in FIG. 27. The remainder of the carriers 23 are fitted with spools of non-thread-defining element 18, preferably like those shown in FIG. 22. As core 12 is passed through the deck 21 of braider 20, the reinforcements 16 and 18 are braided into a tubular fabric layer on to the core 12. As a result of the braiding action, the thread-defining element 16 is secured to core 12 by a plurality of non-thread-defining elements 18 which envelop the core 12 in an opposite sense helical pattern from that of thread-defining element 16.

Viewed from the perspective of one traveling along the helical path of the thread-defining element 16 upon core 12, thread-defining element 16 is at some points overlapped by non-thread-defining elements 18 and at other points non-thread-defining elements 18 pass between thread-defining elements 16 and the core 12. In this manner the thread(s) of the externally threaded composite member are reinforced with fibers which extend across the direction of the thread(s) as well as with fibers which extend in the direction of the thread(s). Braided layer 14 may be a triaxially braided fabric, the axially extending elements being of generally the same order of size as the helically extending elements. The outer cylindrical surface of core 12 may be coated with or formed of a thermoplastic or thermosettable polymeric or other matrix material. The surface of the core 12 may be heated to promote embedment and bonding of elements 16 and 18 to the core. A liquid bonding polymeric or other matrix material may be applied to the core 12 prior to or subsequent to the core being passed through the braider.

In certain preferred embodiments, the thread-defining element(s) 16 and non-thread-defining elements 18 are impregnated with polymeric or other matrix material. In other preferred embodiments elements 16 and 18 are coated with polymeric or other matrix material. In yet other preferred embodiments elements 16 and 18 are painted with polymeric or other matrix material after braiding onto the core. This may be accomplished simply by brushing on matrix material.

Preferably the elements of the braided layer are arranged in the tubular braided layer such that the braided layer is stable against rotation when a tensile load is applied in the lengthwise direction of the core. In other words, a torque is not generated when a tensile load is so applied.

After the braiding operation the externally threaded composite member may be consolidated by application of heat and vacuum/pressure, for example, by wrapping with an inert film such as PTFE and/or vacuum bagging followed by placement in an autoclave. Preferably additional polymeric or other matrix material is applied subsequent to braiding to coat and protect the braided layer against abrasion and to promote bonding of the braided layer to the core. A distinct abrasion resistant layer chosen for its abrasion resistant properties may be applied subsequent to the matrix material which bonds the elements of the braided layer to one another and to the core.

The matrix materials employed in the manufacture of the core, impregnation of the thread-defining elements, the non-thread-defining elements, and bonding and coating of the braided layer are selected so as to be compatible with one another and to those of the internally threaded members to be used therewith.

ALTERNATE EMBODIMENTS OF EXTERNALLY THREADED MEMBER

In FIG. 25, there is shown an embodiment of an externally threaded member 210 according to the invention. Threaded member 210 includes an elongate core 12, a thread-defining element 214 which extends in helical fashion around and along the exterior cylindrical surface of core 12 and a reinforcing fabric layer such as braided layer 215 which envelops, conforms to and is bonded to the outer surface of the combined core 12 and thread-defining element 214. Thread-defining element 214 is of greater radial projection relative to core 12 than that of the other non-thread-defining elements such as flat bundle braiding elements 216, which are formed into tubular braided fabric layer 215. Preferably the thread-defining element 214 is integrally formed with or bonded to the core 12. In certain preferred embodiments, thread-defining element is as shown and described in reference to FIG. 21, and flat bundle braiding elements 218 are shown and described in reference to FIG. 22.

Thread-defining element 214, may be formed of any suitable fiber including those listed above in regard to the core 12 and nut 113, and may be identical to thread-defining element 16.

Figure 26:
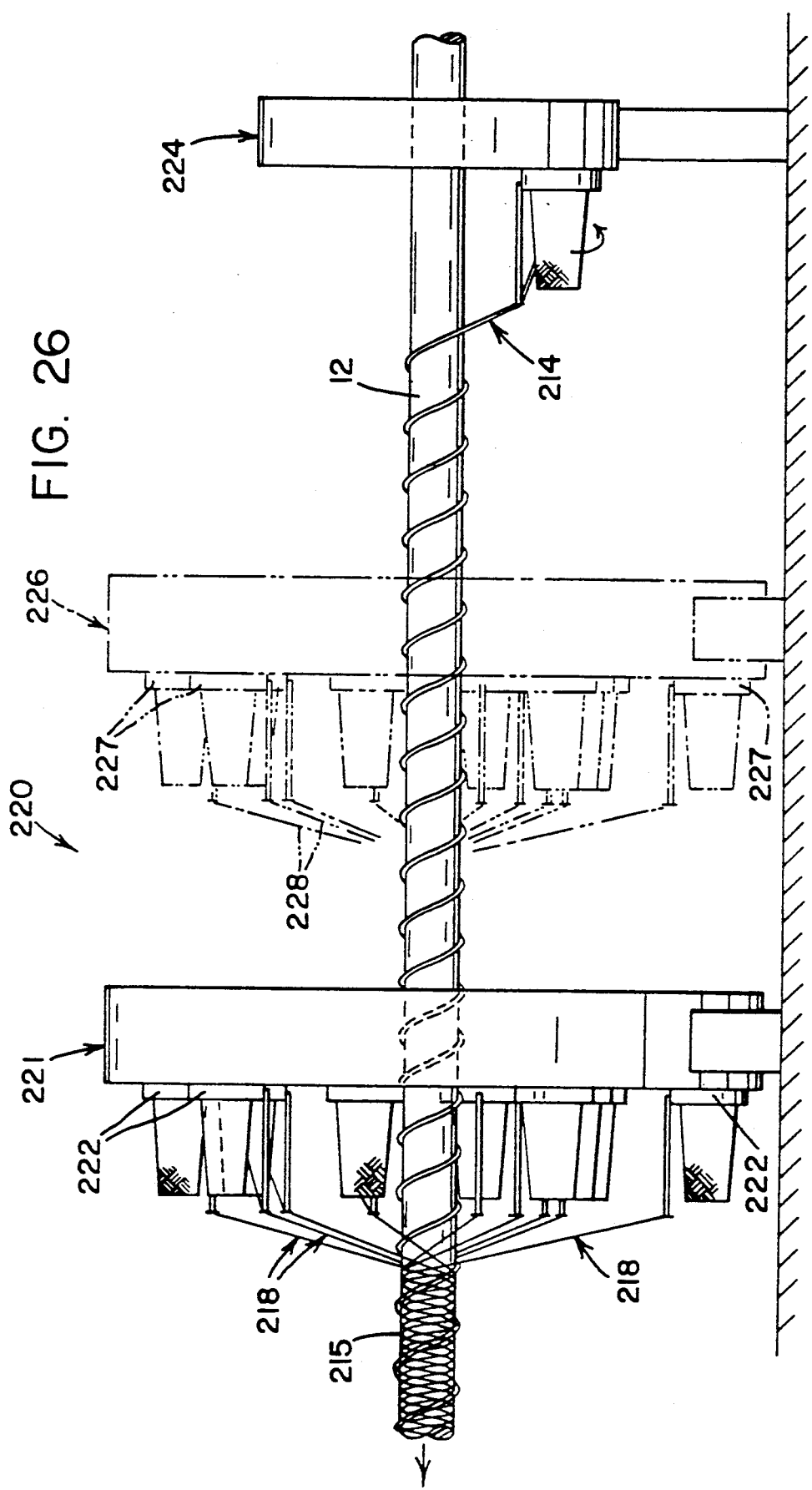
FIG. 26 is a side view schematic depicting manufacture of an externally threaded member according to the invention.

The thread-defining element 214 may be integrally formed with core 12 or may be helically applied to core 12 by a spiral wrapping machine 224 as shown in FIG. 26. Thread-defining element 214 may be polymeric or other matrix material alone, fiber alone or a combination of matrix material and fiber. Thread-defining element 214 may be short fibers or continuous fibers in a matrix. The thread-defining element 214 may itself be formed of a plurality of sub-elements such as filaments of generally rounded cross-sectional configuration. The filaments may be encapsulated with matrix. The filaments may be twisted together into a yarn. A plurality of yarns may be twisted into a cord. A plurality of cords may be twisted to form a larger thread-defining element. A plurality of bundles of filaments or a plurality of yarns or a plurality of cords may themselves be braided to form a thread-defining element. A strip of material may be twisted to form thread-defining element or sub-element. The thread-defining element 214 should be resistant to deformation from its rounded cross-sectional configuration to ensure that element 214 projects radially outwardly from core 12 and influences the contour of the fabric layer formed thereover. In certain preferred embodiments element 214 is of circular cross-sectional configuration and resistant to deformation from such cross-sectional configuration as it is spirally wrapped onto core 12 In certain preferred embodiments this is achieved by forming element 214 of tightly compacted fibers and/or pre-impregnating the sub-elements 17 with a polymeric or other matrix 15 to form a solid circular bundle like that shown in FIG. 21. Following application to the core, thread-defining element 214 may be approximately of D-shaped cross-sectional configuration, being deformed slightly where it is brought into contact with the core.

As shown in FIG. 25, the flat bundle braiding elements 216 of braided fabric layer 215 are preferably of flattened cross-sectional configuration. These flat bundle elements 216 may be as shown and described with reference to FIG. 22.

In a manner analogous to the difference between the embodiments illustrated in FIGS. 23 and 24, an externally threaded member analogous to that depicted in FIG. 25 may include a plurality of thread-defining elements, each of which extends helically along the outer surface of core 12. Such a multi-threaded member retains a significant portion of its holding power in the event that one or more of its thread-defining elements are damaged or broken. Such thread-defining elements may be formed of short fibers in a polymeric or other matrix.

A portion of the manufacturing process for the certain embodiments of threaded members according to the present invention is illustrated in FIG. 26. Apparatus 220 contains in functional sequence a spiral wrap machine 224 and a fabric layer forming machine such as braider deck 221 shown in solid lines or knitting machine 226 shown in dashed lines. Braider deck 221 is conventional and includes a desired number of yarn or cord carriers 222. Braider deck 221 may be the same as apparatus 115 shown in FIGS. 2 and 3 or apparatus 104 shown in FIG. 19. The number of carriers is not critical. The number of carriers needed for complete coverage of the surface of the core 12 increases with the size of the core in a manner well known to those skilled in the art of tubular braiding. For fasteners of up to about 1" (2.54 cm) diameter, commonly available twenty-four to thirty-six carrier single deck braiding machines may be employed to obtain full coverage of the core 12 with braided layer 215. Each of carriers 222 is fitted with a spool of continuous non-thread-defining element such as flat bundle element 18 shown in FIG. 22 and flat bundle element 218 in FIG. 25 As core member 12 is passed through apparatus 220, thread-defining helical element 214 is spirally wrapped onto the core 12 by spiral wrap machine 224 and thereafter a reinforcing fabric layer 215 is formed by braider deck 221 which braids the braiding elements 218 on to the spiral wrapped core. The thread-defining element 214 is bonded to the core 12 with polymeric or other matrix material. The thread-defining element 214 is also secured to core 12 by a plurality of non-thread-defining elements 218 which envelop the combined core 12 and helically extending thread-defining element 214 in the same and in opposite directional sense helical patterns from that of thread-defining element 214. Thread-defining element 214 is overlapped by non-thread-defining elements 218 of fabric layer 215. Fabric layer 215 closely conforms to and follows the outer surface contours of the combined core 12 and thread-defining helical element 214. Braider deck 221 may be arranged to produce a triaxial fabric layer that secures thread-defining element 214 to core 12.

Still having reference to FIG. 26, there is shown in dashed lines an alternate means for forming a reinforcing layer which overlies and closely conforms to the spirally wrapped core. The combined core 12 and helical thread-defining element 214 may be passed through knitting machine 226 which forms a tubular knit reinforcing fabric from yarns 228 provided on carriers 227.

The core, as previously discussed, may or may not include a helical thread-defining element at the start of the process. If no helical thread-defining element is present on the core, one is applied for example and without limitation by spiral wrapping or extrusion. The thread-defining element may be formed of polymeric or other matrix material alone, fibrous material alone or a combination of polymeric or other matrix and fibrous materials. The thread-defining element may be coated or impregnated with matrix material prior to and/or subsequent to its application to the core.

The outer cylindrical surface of core may be coated with or formed of a thermoplastic or thermosettable polymer or other matrix material The surface of the core may be heated to promote embedding and bonding of the helical thread-defining element and fabric layer to the core. A liquid bonding polymeric material may be applied to the core prior to or subsequent to the core being passed through the spiral wrap machine and the fabric layer forming apparatus. Over the combined core and thread-defining helically extending element there is formed a layer of reinforcing fabric, preferably by braiding or knitting. Fibrous material used in forming the reinforcing fabric layer may be coated or impregnated with matrix material prior to use to aid in bonding the fibrous material to the combined core and thread-defining element. The combined core, thread-defining element and fabric layer are secured to one another, preferably by chemical bonding.

Preferably the fibrous elements forming the reinforcing fabric layer are arranged in the tubular reinforcing fabric layer such that the fabric layer is stable against rotation when a tensile load is applied in the lengthwise direction of the core. In other words, a torque is not generated which tends to rotate the core when a tensile load is so applied.

After the formation of the reinforcing fabric layer which secures the thread-defining element, the composite member may be consolidated by application of heat and vacuum/pressure, for example, by wrapping with an inert film such as PTFE and/or vacuum bagging followed by placement in an autoclave. This consolidation step forces the reinforcing fabric to more closely conform to the contours defined by the underlying combined core and thread-defining element. Preferably additional matrix material is applied subsequent to formation of the fabric layer to form a sheath such as sheath 219 shown in FIG. 25 which coats and protects the underlying structure against abrasion and promotes bonding of the braided layer to the core. Multiple applications of polymeric or other matrix material may be employed to build up a protective sheath. A distinctly different material selected primarily for its abrasion resistance may be applied subsequent to bonding of the reinforcing fabric layer.

CONSIDERATIONS FOR CARBON/CARBON COMPOSITE THREADED

The design, manufacture, use and properties of carbon/carbon composite materials may be exemplified by the following patents:

| Patentee | Pat. No. | Issue Date |
| --- | --- | --- |
| Bauer | U.S. 3,991,248 | November 9, 1976 |
| Stover | U.S. 4,400,421 | August 23, 1983 |
| Harder | U.S. 4,567,007 | January 8, 1986 |
| Vasilos | U.S. 4,613,522 | September 23, 1986 |
| Strangman et al | U.S. 4,668,579 | May 26, 1987 |
| Shultz | U.S. 4,576,770 | March 18, 1986 |
| Yeager et al | U.S. 4,659,624 | April 21, 1987 | and the following articles from open literature:

1. Eric Fitzer, "Carbon Fibers-the Miracle Material for Temperatures Between 5 and 3000k", High Temperatures-High Pressures., 18 (1986) 479-508.

2. E. Fitzer and W. Huttner, "Structure and Strength of Carbon/Carbon Composites", J. Phys. D: Appl. Phys., 14 (1981) 347-71.

3. Eric Fitzer, "The Future of Carbon/Carbon Composites", Carbon, 25 (1987) 163-190.

4. Donald M. Curry, H. C. Scott and C. N. Webster, "Material Characteristics of Space Shuttle Reinforced Carbon-Carbon", 24th National SAMPE Symposium, P. 1524 (1979).

Oxidation protection may be imparted to carbon-containing composite materials and threaded members according to the invention in the manner shown and described in U.S. Pat. No. 4,795,677 to Paul B. Gray.

In low temperature and low stress applications, it is adequate to utilize a core formed of graphite such as, by way of example and without limitation, Stackpole 2301 available from Stackpole Carbon Company. Where greater strength is desired or necessary, the carbon or graphite matrix of the core may be filled with discontinuous or continuous carbon fibers. Where greatest tensile strength is desired, the core is preferably formed of axially extending continuous carbon fibers bonded with a carbon matrix.

A particularly suitable core for externally threaded members where high modulus and strength and temperature resistance are desired is a rod formed of continuous carbon filaments bonded in a carbon matrix. Such a core may be made by wetting or impregnating continuous filament carbon tow with a carbonaceous resin precursor, drawing the wetted tow through a circular die and thereafter baking the resin to cure it into a structurally rigid form. One or more braided carbon fiber layers may be formed on the rigid rod. Pyrolysis is preferably not done at this time. Rather pyrolysis is preferably accomplished after application of the thread-defining element(s) and reinforcing fabric layer(s) to form a carbon matrix which bonds the continuous axially extending carbon fibers. Extruded/pultruded rod products are commercially available, for example, from Creative Pultrusions.

After formation of the braided or other reinforcing fabric layer(s) of the threaded member being manufactured, the assembly is preferably consolidated with the core by vacuum bagging followed by application of pressure and heat such as in an autoclave. The amount of heat applied at this temperature is not so great as to effect pyrolysis of the binder materials but sufficient to effect curing of any resin bonding materials to bond the carbon fibers of the braided or other reinforcing fabric layer(s) to themselves and to the core in the case of manufacture of an externally threaded member. As appropriate, a bakeout cycle may be employed to cause controlled decomposition of the carbon-bearing resins utilized in manufacture. Thereafter the temperature is elevated to cause complete pyrolysis and form a carbon matrix. Thereafter conventional CVD/CVI or impregnation operations are undertaken to infiltrate and strengthen and densify the combined reinforcing fabric layer(s) and core in the case of manufacture of an externally threaded member by the in situ deposition of additional carbon to form a threaded carbon fiber reinforced carbon composite member.

Multiple cycles of impregnation or infiltration with liquid containing polymeric resin which is carbonizable upon pyrolysis may be employed. A sheath of abrasion resistant polymeric resin may be applied before or after final pyrolysis steps, depending on intended application to result is an externally threaded carbon fiber reinforced carbon matrix composite fastener.

In manufacture of carbon/carbon composite fasteners according to the invention an organic matrix is subsequently replaced by a carbon matrix. The organic matrix serves as a temporary binder system. The binder system includes an organic resin and optionally an organic solvent for the resin. The organic resin functions at temperatures below its decomposition temperature as a tackifier and adhesion enhancing agent to adhere the carbon fibers as they are laid up into the form of the carbon/carbon fastener being manufactured to one another and to the core where appropriate. An organic solvent may be employed to enhance wetting and flow of the organic resin into the tow of carbon fiber. Particularly preferred resins are phenolic resins and coal tar pitch which have carbon char yields of from about 50 to about 90% respectively although any organic polymer precursor material which can be pyrolyzed provide carbon having a carbon content of from about 40 to about 95% by weight is acceptable. Also useful are polyimide and furane resins. From about 20 to about 60% by weight of such an organic polymer precursor material is typically employed as a binder for the carbon fibers. Other suitable binders may be considered as only temporary binders because upon reaching decomposition temperature they essentially volatilize leaving behind little or no carbon char. Exemplary of such temporary binders are polyvinyl alcohols and most epoxies A thread-defining element such as element 214 in FIG. 25 may be formed of particulate carbonaceous material in a carbonizable resin or pitch or fiber alone or a combination of carbon fiber and carbon precursor materials which are extruded or molded on to the core.

Certain aspects of the invention will now be further illustrated by the following examples.

Example 1

Twelve carriers of a twenty-four carrier tubular braiding machine were loaded with T-300 carbon yarns each having 12,000 filaments. As a wooden dowel rod of one fourth inch diameter was drawn through the deck of the braider, a tubular braided fabric layer was formed onto the dowel at about a 45 degree angle. The dowel with fabric layer was painted with a phenolic resin. Thereafter the painted assembly was placed in a vacuum bag at room temperature to consolidate the braided layer and remove entrapped air. After consolidation of the assembly, a second braided layer including an integral thread-defining element was formed thereon. For this second layer, two of the twelve carriers were loaded with 24,000 filament T-300 "shoestring" yarn which was previously braided using eight carriers each loaded with a 3000 filament yarn, and ten carriers were loaded with 3000 filament T-300 yarn. Phenolic resin was painted onto the second braided layer. After vacuum bagging, the assembly was cured for 3 hours at 250° F. Thereafter, the cured assembly was placed in a high temperature CVD/CVI furnace and densified at a temperature of about 1850° F. using flowing hydrocarbon-containing gas (natural gas) at subatmospheric pressure.

A hollow, externally threaded, cylindrical carbon/carbon composite member having two thread-defining elements was thereby produced. The wooden dowel rod shrank cleanly away from the inside of the composite internally threaded product.

Example 2

A sample was prepared as described in Example 1 through preparation of a cured assembly. The cured assembly was placed in a high temperature CVD/CVI furnace and densified by in situ formation of silicon carbide (SiC) at a temperature of about 2050° F. using flowing methyltrichlorosilane ($CH_3SiCl_3$) diluted with hydrogen at subatmospheric pressure. The product was a hollow, braided, carbon fiber reinforced, externally threaded rod having a silicon carbide matrix coating and bonding the fibers. Slight unraveling of the braided carbon fibers occurred during furnacing. The wooden dowel rod shrank and was lightly bonded to a portion of the interior surface of the product. The dowel rod was easily removed without apparent damage to the composite product.

Example 3

A bolt having an integrally braided fiber reinforced head and compression molded threads was made as follows. A length of rope having several concentric braided layers of T-300 6K carbon fiber tow over a central tow strand was manually reformed adjacent one of its ends to create a preform having a bunched up area of greater diameter adjacent one end. The fiber content of the rope is estimated to be about 50 volume percent. The rope had a diameter of about one half inch (no tension applied). The entire preform was infiltrated with phenolic resin by immersion under vacuum for 30 minutes, then removed from the bath and dried overnight at 150° F. temperature. This infiltration cycle was repeated once. Thereafter the prepregged preform was placed in a metal mold which was placed in a heated platen press. The mold was designed to enable it to be split lengthwise into two pieces. The mold included a PTFE coated interior to aid in release of the molded and cured preform. The mold included an interior cavity defining a one-half inch shank diameter and 12 threads per inch at the end of the shank distal the head. The cured preform was loaded into a standard carbonization furnace and processed through a slow pyrolysis cycle to convert the cured resin to carbon. The resulting carbon/carbon bolt included a head that was not hexagonal and there existed an area of reduced shank diameter adjacent the head due to transfer of fiber from this area to the head during the manual shaping operation. The carbonized preform was CVI densified with carbon. The resulting carbon fiber reinforced/carbon matrix bolt exhibited a very well made shank. The head area was not well compacted. A necked down area of the shank remained adjacent the head. The threads were only roughly defined. This is believed due to the use of too large (T-300, 6K) a tow to permit better definition. The shank area (other than the necked down area) is believed eminently suitable for use as a shear pin.

Example 4

A braided hex nut was built in the following manner.

A wooden mandrel was machined from a hardwood dowel to have six threads per inch at an outside diameter of 0.396 inch. The dimensions of the wooden mandrel were taken from a previously manufactured externally threaded composite member made according to the invention. A coating of phenolic resin is painted on to the mandrel. Twelve carriers of a twenty-four carrier tubular braiding machine were loaded each with a spool of T-300 PAN carbon yarn having 3K filaments and a braided thread-reinforcing layer was formed on to the helically grooved wooden core. A braided "shoestring" containing 11K carbon filaments was prepared by braiding 8 tows of 1K filament PAN carbon yarn onto a 3K filament core. This "shoestring" was hand-wound under tension into the helical valley or groove of the wooden mandrel to substantially fill the valley and result in a near cylindrical outer surface. Thereafter, two more reinforcing fabric layers were formed from twelve tows of 3K carbon filaments braided on to the underlying structure. Thereafter, twenty-four carriers of the braider were loaded each with a spool of 3K carbon yarn and seven more layers were braided on to the underlying structure Thereafter, the braider was provided with six equally circumferentially spaced heavy axial tows, each of the same construction as the "shoestring". Application of this single triaxially braided layer resulted in a part having a distinct hexagonal outer surface. Thereafter, further layers were braided of 3K carbon tow until the resultant structure had a diameter slightly more than five-eighths inch. Prior to application of each fabric layer, the core or underlying subassembly was coated by painting with a phenolic resin. Following the final coating of phenolic resin, the assembly was wrapped with one mil PTFE film and cured for three hours at 250 degrees F. in air at atmospheric pressure, and thereafter carbonized and CVD/CVI densified. The wooden core shrank away from the inside of the carbon/carbon composite internally threaded member which was thereafter cut into a plurality of hex nuts.

The foregoing description and embodiments are intended to illustrate the invention without limiting it thereby. It will be understood that various modifications can be made from the preferred embodiments which have been described in detail. These variations are intended to be included within the present specification and claims. Examples of such variations are the following.

The methods described herein for the manufacture of externally or internally threaded composite fasteners may be employed to manufacture hollow tubular members. The matrices may be polymeric, carbon or ceramic. The fibers may be polymeric, carbon or ceramic. Combinations of different classes of materials may be employed in a single fastener or tubular member. For example, ceramic fibers such as Nextel TM alumina fibers available from Minnesota Mining and Manufacturing Company, Nicalon TM glassy silicon carbide fibers available from Dow Corning and Nippon Carbon Company of Japan may be used in place of or in combination with carbon fibers. Preforms may be infiltrated or impregnated with ceramic particulate bearing slurries or resins or with a ceramic precursor such as a sol gel. Suitable ceramic materials include, but are not limited to oxide ceramics such as alumina and the like, and non-oxide ceramics such as metal carbides, borides and nitrides and the like, and glassy ceramics. Because oxide ceramics react with carbon at elevated temperatures, a barrier layer is needed between the carbon fiber and the matrix. Silicon carbide is exemplary of a suitable barrier layer.

Although the invention has been described with reference to its preferred embodiments, other embodiments can achieve similar results. Variations and modifications of the present invention will be obvious to those skilled in the art and it is intended to cover in the appended claims all such modifications and equivalents.

What is claimed is:

1. A hollow internally threaded member formed of fibers bound in a matrix, said member having an interior surface having an integral thread having a rounded apex, said thread including a reinforcing fabric layer extending in the axial direction of the member and conforming to the threads, said member having an exterior cross-sectional configuration other than round defined and reinforced by a tubular braided triaxial fabric having axially extending elements of greater size than the remainder of the elements forming the triaxial fabric.

2. The hollow member of claim 1 further having a helically extending fibrous tow between the reinforcing fabric layer and the triaxial fabric which helical fibrous tow is offset in the axial direction of the internally threaded member relative to its interior surface thread.

3. The hollow member of claim 1 wherein the helically extending fibrous tow substantially fills the area between successive turns of the interior surface thread and provides a substantially cylindrical surface over which lie a plurality of layers of reinforcing fabric.

4. The hollow member of claim 1 wherein the thread reinforcing fabric layer is selected from the group consisting of tubular braided fabric and tubular knit fabric.

5. The hollow member of claim 1 wherein the thread is reinforced with closely spaced fibers which extend axially of the hollow member in opposite sense helices.

6. The hollow member of claim 1 including a plurality of layers of reinforcing fabric which may be of differing material distributed throughout.

7. The hollow member of claim 1 wherein the matrix is selected from the group consisting of polymeric, carbon, ceramic, glass, precursor of carbon, precursor of glass, and precursor of ceramic material and the fabric material contains at least one of polymeric, glass, carbon and ceramic fibers.

8. The hollow member of claim 1 comprising a matrix permeating and encapsulating a bundle of sequentially applied coaxial reinforcing fabric layers extending throughout in the axial direction of the hollow member, the innermost layer of reinforcing fabric having continuous undulate members closely conforming to the contour of the thread.

9. In combination, the hollow member of claim 1 threadedly joined to an externally threaded member of complementary thread pitch and thread diameter 10. The combination of claim 9 wherein the hollow member and externally threaded member are bonded together.

11. The combination of claim 9 wherein the externally threaded member comprises an elongate core and a tubular braided layer bonded to the exterior surface of the core, the braided layer including at least one element of greater radial projection relative to the core than the remainder of the elements forming the braided layer, said at least one element of greater radial projection defining the helical thread appearing on the exterior surface of the core.

12. The combination of claim 9 wherein the externally threaded member comprises a fiber-reinforced rod having a thread-defining element helically extending around and along the lengthwise direction of the core and projecting radially outwardly of the core, and a fabric layer enveloping, conforming and secured to the outer surface of the combined core and thread-defining element.

13. The combination of claim 9 wherein the externally threaded member comprises a rod having reinforcing fibers selected from the group consisting of ceramic fibers, carbon fibers, glass fibers and aramid fibers extending throughout in the lengthwise direction of the rod, said rod having its thread reinforced by a continuous textile fabric layer enveloping, conforming and bonded with a matrix to the rod.

14. The hollow member of claim 1 wherein the triaxial fabric includes six axially extending elements of greater size than the remainder of the elements forming the triaxial fabric, spaced equally about the circumferential direction of the hollow member which define corners.

15. The hollow member of claim 1 having a four-sided exterior cross-sectional configuration wherein the triaxial fabric includes four axially extending elements of greater size than the remainder of the elements forming the triaxial fabric.

16. The combination of claim 11 wherein the tubular braided layer bonded to the exterior surface of the core includes axially extending elements 17. The hollow member of claim 1 having an exterior cross-sectional configuration in the form of a closed figure consisting of arcuate portions joined by straight portions, the triaxial fabric including two circumferentially spaced groups of axially extending elements of greater size than the remainder of the elements forming the triaxial fabric, each group including circumferentially closely spaced axially extending elements which together define one of said arcuate portions.

18. The hollow member of claim 1 further having additional fabric layers overlying the triaxial fabric which defines the exterior cross-sectional configuration of the hollow member.

* * * * *